United States Patent
McCormack et al.

(10) Patent No.: US 12,482,080 B2
(45) Date of Patent: *Nov. 25, 2025

(54) LOCATION MAPPING FOR LARGE SCALE AUGMENTED-REALITY

(71) Applicant: Snap Inc., Santa Monica, CA (US)

(72) Inventors: Richard McCormack, Princes Risborough (GB); Qi Pan, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,293

(22) Filed: Jan. 17, 2024

(65) Prior Publication Data

US 2024/0153049 A1 May 9, 2024

Related U.S. Application Data

(63) Continuation of application No. 17/837,713, filed on Jun. 10, 2022, now Pat. No. 11,915,400, which is a
(Continued)

(51) Int. Cl.
*G06T 5/80* (2024.01)
*G06T 19/00* (2011.01)
(Continued)

(52) U.S. Cl.
CPC .............. *G06T 5/80* (2024.01); *G06T 19/006* (2013.01); *H04W 4/021* (2013.01); *H04W 4/029* (2018.02);
(Continued)

(58) Field of Classification Search
CPC .... H04W 4/029; H04W 4/021; G06T 19/006; G06T 5/80; G06T 2207/30184; G06T 2207/10028; G06F 16/29
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| CN | 110383344 | 10/2019 |

(Continued)

OTHER PUBLICATIONS

U.S. Appl. No. 16/833,087 U.S. Pat. No. 10,956,743, Mar. 27, 2020, Shared Augmented Reality System.
(Continued)

*Primary Examiner* — Congvan Tran
(74) *Attorney, Agent, or Firm* — Schwegman Lundberg & Woessner, P.A.

(57) ABSTRACT

An Augmented-Reality which performs operations that include: accessing a data object that comprises image data, location data, and orientation data; applying a transformation to the data object to produce a rectified data object; generating a point cloud based on the rectified data object; assigning the point cloud to a location based on at least the location data of the data object; detecting a client device at the location; and loading the point cloud to the client device in response to the detecting the client device at the location.

20 Claims, 9 Drawing Sheets

Related U.S. Application Data continuation of application No. 16/833,160, filed on Mar. 27, 2020, now Pat. No. 11,430,091.

(51) Int. Cl.
 *H04W 4/021* (2018.01)
 *H04W 4/029* (2018.01)

(52) U.S. Cl.
 CPC .............. *G06T 2207/10028* (2013.01); *G06T 2207/30184* (2013.01)

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,154,764 | A | 11/2000 | Nitta et al. |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,508,419 | B2 | 3/2009 | Toyama et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,234,350 | B1 | 7/2012 | Gu et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,326,315 | B2 | 12/2012 | Phillips et al. |
| 8,326,327 | B2 | 12/2012 | Hymel et al. |
| 8,332,475 | B2 | 12/2012 | Rosen et al. |
| 8,352,546 | B1 | 1/2013 | Dollard |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |
| 8,471,914 | B2 | 6/2013 | Sakiyama et al. |
| 8,472,935 | B1 | 6/2013 | Fujisaki |
| 8,510,383 | B2 | 8/2013 | Hurley et al. |
| 8,527,345 | B2 | 9/2013 | Rothschild et al. |
| 8,554,627 | B2 | 10/2013 | Svendsen et al. |
| 8,560,612 | B2 | 10/2013 | Kilmer et al. |
| 8,594,680 | B2 | 11/2013 | Ledlie et al. |

(56) References Cited

U.S. PATENT DOCUMENTS

| | | |
|---|---|---|
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,740,895 B1* | 8/2017 | Liu .................. G06Q 10/06 |
| 9,852,149 B1 | 12/2017 | Taylor et al. |
| 9,854,219 B2 | 12/2017 | Sehn |
| 9,984,499 B1 | 5/2018 | Jurgenson et al. |
| 10,515,480 B1 | 12/2019 | Hare et al. |
| 10,657,708 B1 | 5/2020 | Jurgenson et al. |
| 10,956,743 B1 | 3/2021 | Li et al. |
| 10,997,783 B2 | 5/2021 | Jurgenson et al. |
| 11,194,983 B1* | 12/2021 | Obeyesekere ........ G06T 19/006 |
| 11,263,459 B2 | 3/2022 | Li et al. |
| 11,348,265 B2 | 5/2022 | Nielsen et al. |
| 11,380,051 B2 | 7/2022 | Jurgenson et al. |
| 11,430,091 B2 | 8/2022 | Mccormack et al. |
| 11,776,256 B2 | 10/2023 | Li et al. |
| 11,915,400 B2 | 2/2024 | Mccormack et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |

(56) References Cited

U.S. PATENT DOCUMENTS

| | | |
|---|---|---|
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0216179 A1* | 9/2011 | Dialameh ............... G06V 10/17 348/E7.085 |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |

(56) References Cited

U.S. PATENT DOCUMENTS

| | | |
|---|---|---|
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311598 A1* | 11/2013 | Arrouye ............... G06Q 10/10 709/217 |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0016666 A1 | 1/2015 | Payne, Jr. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |

(56) References Cited

U.S. PATENT DOCUMENTS

| | | | |
|---|---|---|---|
| 2016/0182875 A1 | 6/2016 | Sehn | |
| 2016/0239248 A1 | 8/2016 | Sehn | |
| 2016/0277419 A1 | 9/2016 | Allen et al. | |
| 2016/0321708 A1 | 11/2016 | Sehn | |
| 2017/0006094 A1 | 1/2017 | Abou Mahmoud et al. | |
| 2017/0061308 A1 | 3/2017 | Chen et al. | |
| 2017/0262154 A1 | 9/2017 | Black et al. | |
| 2017/0287006 A1 | 10/2017 | Azmoodeh et al. | |
| 2018/0176483 A1 | 6/2018 | Knorr et al. | |
| 2018/0183737 A1 | 6/2018 | Subbarayan et al. | |
| 2018/0204469 A1 | 7/2018 | Moster et al. | |
| 2019/0026400 A1 | 1/2019 | Fuscoe et al. | |
| 2019/0088086 A1 | 3/2019 | Rajendran | |
| 2019/0102941 A1 | 4/2019 | Khan et al. | |
| 2019/0149725 A1 | 5/2019 | Adato et al. | |
| 2019/0188477 A1 | 6/2019 | Mair et al. | |
| 2019/0279420 A1 | 9/2019 | Moreno et al. | |
| 2020/0065711 A1 | 2/2020 | Clément et al. | |
| 2020/0073969 A1 | 3/2020 | Kursar | |
| 2020/0090409 A1 | 3/2020 | Fink et al. | |
| 2020/0167956 A1 | 5/2020 | Herman et al. | |
| 2020/0219312 A1 | 7/2020 | Jurgenson et al. | |
| 2020/0250858 A1 | 8/2020 | Li et al. | |
| 2020/0265548 A1 | 8/2020 | Burleigh et al. | |
| 2020/0276973 A1 | 9/2020 | Meijburg et al. | |
| 2020/0363216 A1* | 11/2020 | Elvanoglu | G06Q 10/02 |
| 2021/0019946 A1 | 1/2021 | Sonasath et al. | |
| 2021/0125411 A1 | 4/2021 | Choi et al. | |
| 2021/0142574 A1* | 5/2021 | Ohashi | A63F 13/216 |
| 2021/0174578 A1 | 6/2021 | Jurgenson et al. | |
| 2021/0297502 A1 | 9/2021 | Seul et al. | |
| 2021/0303859 A1 | 9/2021 | Li et al. | |
| 2021/0304369 A1 | 9/2021 | Mccormack et al. | |
| 2022/0148309 A1 | 5/2022 | Li et al. | |
| 2022/0179665 A1 | 6/2022 | Rathod | |
| 2022/0301122 A1 | 9/2022 | Mccormack et al. | |
| 2023/0316746 A1 | 10/2023 | Li et al. | |

FOREIGN PATENT DOCUMENTS

| | | |
|---|---|---|
| CN | 110892410 | 3/2020 |
| CN | 115335820 A | 11/2022 |
| CN | 115698907 A | 2/2023 |
| EP | 2051480 A1 | 4/2009 |
| EP | 2151797 A1 | 2/2010 |
| EP | 3547157 A1 | 10/2019 |
| GB | 2399928 A | 9/2004 |
| KR | 19990073076 A | 10/1999 |
| KR | 20010078417 A | 8/2001 |
| KR | 20180015120 | 2/2018 |
| KR | 20190122249 | 10/2019 |
| KR | 20200020960 | 2/2020 |
| KR | 20220154816 A | 11/2022 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2021195192 A1 | 9/2021 |
| WO | WO-2021195670 A1 | 9/2021 |
| WO | WO-2021252201 A2 | 12/2021 |
| WO | WO-2022147031 A1 | 7/2022 |

OTHER PUBLICATIONS

U.S. Appl. No. 17/119,597 U.S. Pat. No. 11,263,459, Dec. 11, 2020, Shared Augmented Reality System.

U.S. Appl. No. 17/584,946 U.S. Pat. No. 11,776,256, Jan. 26, 2022, Shared Augmented Reality System.

U.S. Appl. No. 18/203,876, filed May 31, 2023, Shared Augmented Reality System.

U.S. Appl. No. 16/833,160 U.S. Pat. No. 11,430,091, Mar. 27, 2020, Location Mapping for Large Scale Augmented-Reality.

U.S. Appl. No. 17/837,713, filed Jun. 10, 2022, Location Mapping for Large Scale Augmented-Reality.

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 16/833,087, Notice of Allowance mailed Nov. 23, 2020", 10 pgs.

"U.S. Appl. No. 16/833,160, Non Final Office Action mailed Nov. 30, 2021", 8 pgs.

"U.S. Appl. No. 16/833,160, Notice of Allowability mailed May 4, 2022", 2 pgs.

"U.S. Appl. No. 16/833,160, Notice of Allowance mailed Apr. 25, 2022", 6 pgs.

"U.S. Appl. No. 16/833,160, Response filed Feb. 28, 2022 to Non Final Office Action mailed Nov. 30, 2021", 9 pgs.

"U.S. Appl. No. 17/119,597, Non Final Office Action mailed Aug. 24, 2021", 8 Pgs.

"U.S. Appl. No. 17/119,597, Notice of Allowance mailed Oct. 20, 2021", 9 pgs.

"U.S. Appl. No. 17/119,597, Response filed Sep. 14, 2021 to Non Final Office Action mailed Aug. 24, 2021", 7 pgs.

"U.S. Appl. No. 17/119,597, Supplemental Notice of Allowability mailed Nov. 3, 2021", 6 pgs.

"U.S. Appl. No. 17/584,946, Notice of Allowance mailed May 12, 2023", 9 pgs.

"U.S. Appl. No. 17/584,946, Supplemental Notice of Allowability mailed May 24, 2023", 2 pgs.

"U.S. Appl. No. 17/837,713, Final Office Action mailed Aug. 9, 2023", 8 pgs.

"U.S. Appl. No. 17/837,713, Non Final Office Action mailed Apr. 3, 2023", 7 pgs.

"U.S. Appl. No. 17/837,713, Notice of Allowance mailed Oct. 17, 2023", 9 pgs.

"U.S. Appl. No. 17/837,713, Response filed Apr. 11, 2023 to Non Final Office Action mailed Apr. 3, 2023", 7 pgs.

"U.S. Appl. No. 17/837,713, Response filed Sep. 27, 2023 to Final Office Action mailed Aug. 9, 2023", 9 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report mailed Sep. 29, 2015", 2 pgs.

(56) References Cited

OTHER PUBLICATIONS

"International Application Serial No. PCT/US2021/023854, International Preliminary Report on Patentability mailed Oct. 6, 2022", 10 pgs.
"International Application Serial No. PCT/US2021/023854, International Search Report mailed Jun. 29, 2021", 4 pgs.
"International Application Serial No. PCT/US2021/023854, Written Opinion mailed Jun. 29, 2021", 8 pgs.
"International Application Serial No. PCT/US2021/070318, International Preliminary Report on Patentability mailed Oct. 6, 2022", 7 pgs.
"International Application Serial No. PCT/US2021/070318, International Search Report mailed Jun. 30, 2021", 4 pgs.
"International Application Serial No. PCT/US2021/070318, Written Opinion mailed Jun. 30, 2021", 5 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"Korean Application Serial No. 10-2022-7036946, Response filed Feb. 18, 2025 to Notice of Preliminary Rejection mailed Nov. 20, 2024", w English Claims, 12 pgs.
"Korean Application Serial No. 10-2022-7036918, Response filed Feb. 3, 2025 to Notice of Preliminary Rejection mailed Dec. 3, 2024", w English Claims, 15 pgs.
"European Application Serial No. 21719520.5, Response filed Mar. 26, 2025 to Communication Pursuant to Article 94(3) EPC mailed Dec. 9, 2024", 15 pgs.
"European Application Serial No. 21719386.1, Communication Pursuant to Article 94(3) EPC mailed Jun. 6, 2024", 9 pgs.
"European Application Serial No. 21719386.1, Response filed Oct. 2, 2024 to Communication Pursuant to Article 94(3) EPC mailed Jun. 6, 2024", 19 pgs.
"European Application Serial No. 21719520.5, Communication Pursuant to Article 94(3) EPC mailed Dec. 9, 2024", 7 pgs.
"Korean Application Serial No. 10-2022-7036918, Notice of Preliminary Rejection mailed Dec. 3, 2024", w/ English Translation, 4 pgs.
"Korean Application Serial No. 10-2022-7036946, Notice of Preliminary Rejection mailed Nov. 20, 2024", w/ English Translation, 4 pgs.
"Chinese Application Serial No. 202180024381.5, Office Action mailed Apr. 19, 2025", w/ English translation, 18 pgs.
"U.S. Appl. No. 18/203,876, Non Final Office Action mailed May 22, 2025", 25 pgs.

* cited by examiner

ACCESSING A DATA OBJECT THAT COMPRISES IMAGE DATA, LOCATION DATA, AND ORIENTATION DATA
402

APPLYING A TRANSFORMATION TO THE DATA OBJECT TO PRODUCE A RECTIFIED DATA OBJECT
404

GENERATING A POINT CLOUD BASED ON THE RECTIFIED DATA OBJECT
406

ASSIGNING THE POINT CLOUD TO A LOCATION BASED ON AT LEAST THE LOCATION DATA
408

DETECTING A CLIENT DEVICE AT THE LOCATION
410

LOADING THE POINT CLOUD TO THE CLIENT DEVICE IN RESPONSE TO THE DETECTING THE CLIENT DEVICE AT THE LOCATION
412

ACCESSING VIDEO DATA THAT COMPRISES A SET OF VIDEO FRAMES
502

EXPORTING A PORTION OF THE SET OF VIDEO FRAMES, THE PORTION OF THE SET OF VIDEO FRAMES INCLUDING THE DATA OBJECT
504

```
┌─────────────────────────────────────────────────────────┐
│ DETERMINING A CONTEXTUAL CONDITION ASSOCIATED WITH THE  │
│                     CLIENT DEVICE                       │
│                          602                            │
└─────────────────────────────────────────────────────────┘
                            │
                            ▼
┌─────────────────────────────────────────────────────────┐
│   IDENTIFYING A PORTION OF THE POINT CLOUD BASED ON THE │
│                   CONTEXTUAL CONDITION                  │
│                          604                            │
└─────────────────────────────────────────────────────────┘
                            │
                            ▼
┌─────────────────────────────────────────────────────────┐
│  LOADING THE PORTION OF THE POINT CLOUD AT THE CLIENT   │
│                         DEVICE                          │
│                          606                            │
└─────────────────────────────────────────────────────────┘
```

*FIG. 6*

LOCATION MAPPING FOR LARGE SCALE AUGMENTED-REALITY

CROSS-REFERENCE TO RELATED APPLICATION

This application is a continuation of U.S. patent application Ser. No. 17/837,713, filed Jun. 10, 2022, which application is a continuation of U.S. patent application Ser. No. 16/833,160, filed Mar. 27, 2020, now issued as U.S. Pat. No. 11,430,091, each of which are incorporated by reference herein in their entireties.

TECHNICAL FIELD

Embodiments of the present disclosure relate generally to mobile computing technology and, more particularly, but not by way of limitation, to systems for presenting augmented-reality (AR) content at a client device.

BACKGROUND

Augmented-reality is an interactive experience of a real-world environment where the objects that reside in the real world are enhanced by computer-generated perceptual information, sometimes across multiple sensory modalities, including visual, auditory, haptic, somatosensory and olfactory. The primary value of augmented reality is the manner in which components of the digital world blend into a person's perception of the real world, not as a simple display of data, but through the integration of immersive sensations, which are perceived as natural parts of an environment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of generating a point cloud, according to certain example embodiments.

FIG. 5 is a flowchart depicting a method of generating a point cloud, according to certain example embodiments.

FIG. 6 is a flowchart depicting a method of loading a portion of a point cloud at a client device, according to certain example embodiments.

DETAILED DESCRIPTION

Figure 1:
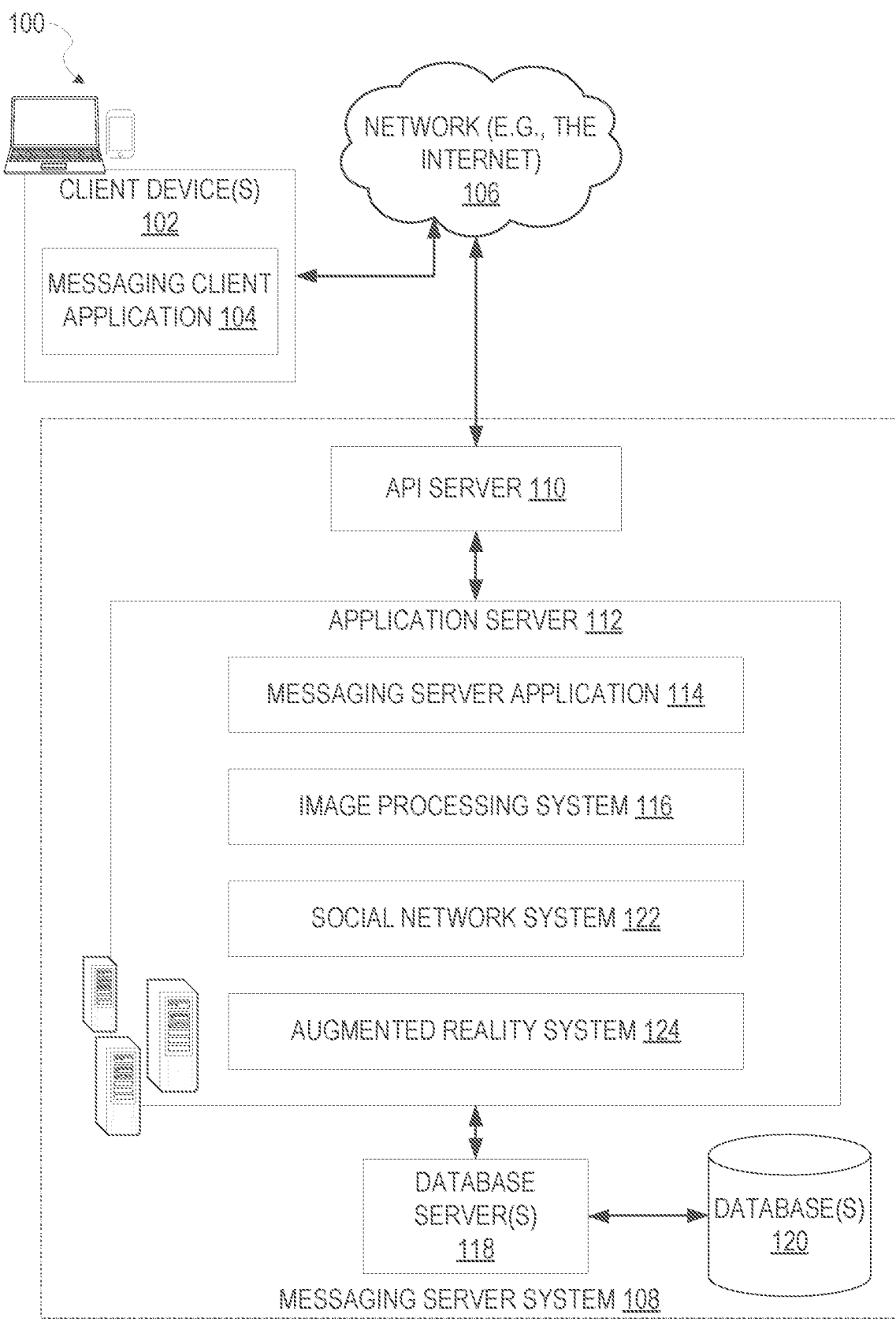
FIG. 1 is a block diagram showing an example messaging system for exchanging data (e.g., messages and associated content) over a network in accordance with some embodiments, wherein the messaging system includes an augmented-reality system.

As discussed above, augmented-reality (AR) is an interactive experience of a real-world environment where the objects that reside in the real world are enhanced by computer-generated perceptual information. Some AR systems make use of point clouds to generate and present AR content, wherein a point cloud is a set of data points in space which measure surface features and external surfaces of objects around them.

Use of point clouds is generally limited to small areas, due to the amount of data required to actually generate a point cloud. For example, the creation of a point cloud that defines the surface features in a single room may be relatively straight forward, while the creation of a point cloud that represents surface features of a neighborhood or city may be logistically impossible under current systems for a number of reasons. Collection of the data necessary to generate such a large point cloud is inherently tedious and time consuming and requires a great deal of organization and analysis. Furthermore, the resulting point cloud generated by such a system would be very large and computationally demanding, making it inefficient and impractical for use in the display of AR content at client devices that include mobile devices.

Accordingly, in certain example embodiments, an AR system is disclosed which performs operations that include: accessing a data object that comprises image data, location data, and orientation data; applying a transformation to the data object to produce a rectified data object; generating a point cloud based on the rectified data object; assigning the point cloud to a location based on at least the location data of the data object; detecting a client device at the location; and loading the point cloud to the client device in response to the detecting the client device at the location.

In some example embodiments, the data object may include images and videos collected by a plurality of client devices and indexed within a database based on location data that corresponds with the images and videos. The AR system may access the database and generate the point cloud for a given location based on the image data and location data from the images and videos collected from the plurality of client devices.

In some example embodiments, the data object may include images and videos collected from an omnidirectional camera (360 camera), wherein the 360 camera has a field of view that covers approximately an entire sphere or at least a full circle in the horizontal plane. In such embodiments, images and videos may be collected from the 360 camera wherein the images and videos include timestamps and location data.

In some example embodiments, to generate the point cloud, the AR system may access video data that comprises a set of video frames, wherein each video frame comprises a timestamp, location data, orientation data, and image data. The AR system may export a portion of the set of video frames, and generate a point cloud based on the portion of the set of video frames. To generate the point cloud based on the data objects, in certain embodiments, the AR system may perform a transformation upon the data object, wherein the transformation includes a linear rectification.

In some embodiments, loading the point cloud at the client device may include operations to identify a portion of the point cloud to be loaded at the client device. For example, as discussed above, a technical issue with the use of point clouds to present AR content in a large environment is the computational demand of a large-scale point cloud. Accordingly, in certain embodiments, the AR system may identify a portion of the point cloud to be loaded at the client device based on one or more contextual conditions or factors.

In some embodiments, the contextual factors may include a location of the client device, wherein the location and orientation of the client device defines a viewpoint of the client device. The AR system may determine what landmarks and surface features are visible from the viewpoint of the client device and identify a portion of the point cloud based on the visible landmarks and surface features from the viewpoint of the client device.

In some embodiments, the contextual factors may include a time of day. In such embodiments, the data objects may comprise images and videos that include timestamps which indicate a time of day in which the images and videos were collected. Accordingly, the point cloud may comprise a plurality of points, wherein a single surface feature may be represented by more than one point, and each point may be based on a different time of day. For example, a given surface feature or landmark may have a first set of points that represent the surface feature or landmark at a first time of day (i.e., morning), and a second set of points that represent the surface feature or landmark at a second time of day (i.e., evening). The AR system may therefore identify the portion of the point cloud based on temporal considerations including a time of day in which the client device is at a given location or in which the client device requests AR content.

In some embodiments, the contextual factors may include attributes of the client device itself, including a memory or storage capacity of the client device, as well as a network connectivity speed of the client device. Accordingly, an optimal size of a portion of a point cloud may be determined based on the device attributes of the client device, and a portion of the point cloud may be selected based on the optimal size.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an AR system 124. The AR system 124 is configured to generate a point cloud based on image data, and load the point cloud at a client device 102, according to certain example embodiments. Further details of the AR system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
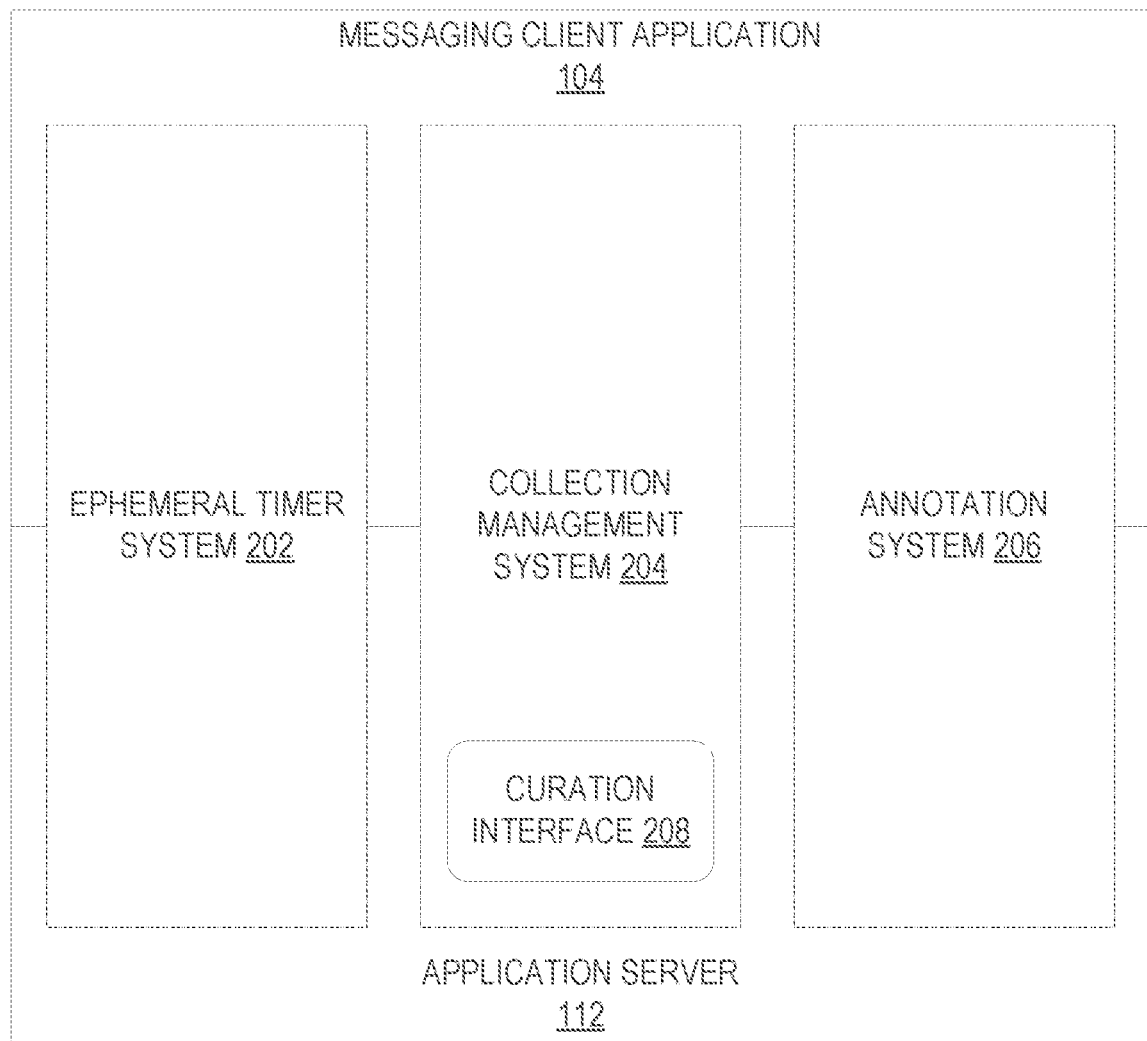
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a collection of media), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter, lens) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models. An example of a visual effect includes color overlaying. The audio and visual content or the visual effects can be applied to a media content item (e.g., a photo or video) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
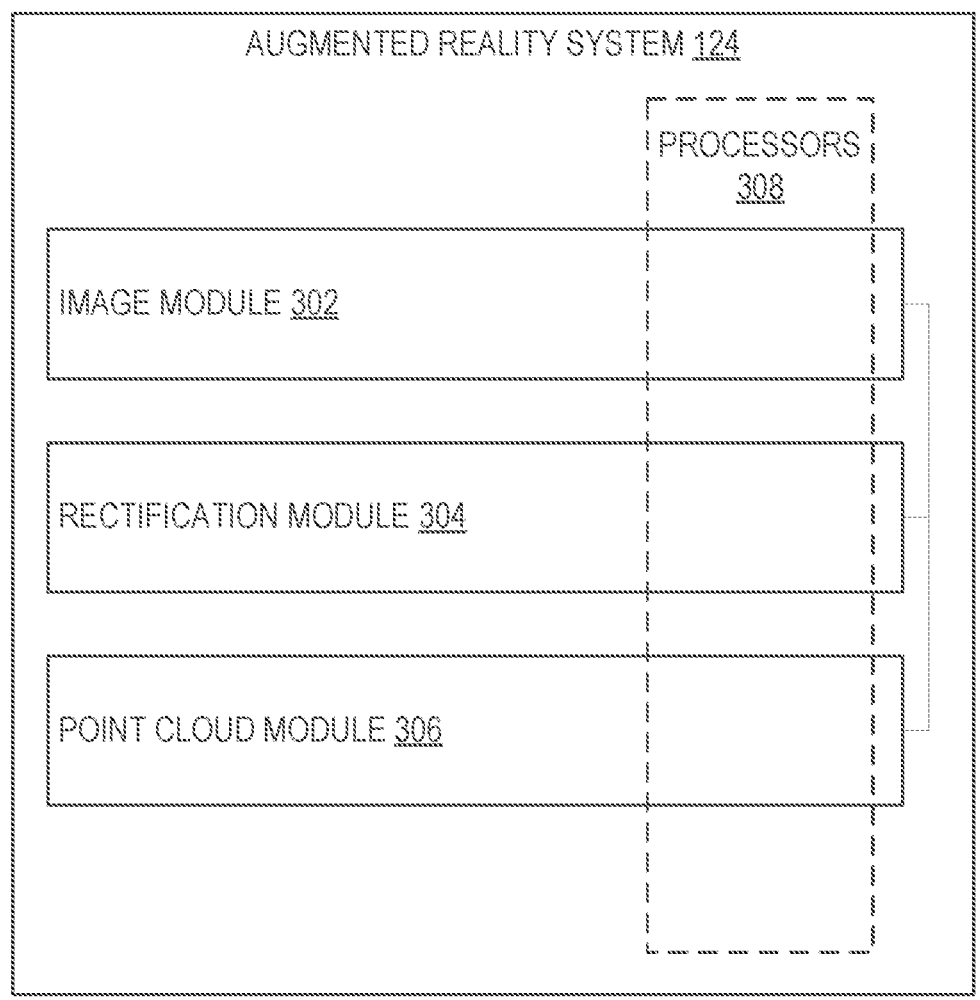
FIG. 3 is a block diagram illustrating various modules of an augmented-reality system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the AR system 124 that configure the AR system 124 to perform operations to generate and cause display of a notification based on a classification associated with a user connection, according to certain example embodiments.

The AR system 124 is shown as including An Image module 302, a rectification module 304, and a point cloud module 306, all configured to communicate with each other (e.g., via a bus, shared memory, or a switch). Any one or more of these modules may be implemented using one or more processors 308 (e.g., by configuring such one or more processors to perform functions described for that module) and hence may include one or more of the processors 308. In certain embodiments, the avatar notification system 124 may include or have access to the database 120, wherein the database 120 may comprise a collection of media content indexed based on user attributes and astrological signs.

Any one or more of the modules described may be implemented using hardware alone (e.g., one or more of the processors 308 of a machine) or a combination of hardware and software. For example, any module described of the avatar notification system 124 may physically include an arrangement of one or more of the processors 308 (e.g., a subset of or among the one or more processors of the machine) configured to perform the operations described herein for that module. As another example, any module of the avatar notification system 124 may include software, hardware, or both, that configure an arrangement of one or more processors 308 (e.g., among the one or more processors of the machine) to perform the operations described herein for that module. Accordingly, different modules of the avatar notification system 124 may include and configure different arrangements of such processors 308 or a single arrangement of such processors 308 at different points in time. Moreover, any two or more modules of the avatar notification system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of generating a point cloud, according to certain example embodiments. Operations of the method 400 may be performed by the modules described above with respect to FIG. 3. As shown in FIG. 4, the method 400 includes one or more operations 402, 404, 406, 408, 410 and 412.

At operation 402, the image module 302 accesses a data object that comprises image data, location data, and orientation data. For example, in some embodiments, the image module 302 may access a repository (i.e., the databases 120), wherein the repository comprises a collection of data objects which are indexed based on location. For example, in some embodiments, the data objects may be collected from a plurality of client devices 102 and indexed within the databases 120 based on the corresponding location data. In some embodiments, the data objects may be generated by an omnidirectional camera and indexed within the databases 120 based on the corresponding location data.

At operation 404, the rectification module 304 applies a transformation to the data object to produce a rectified data object. For example, in some embodiments, the data object may include omnidirectional camera images, wherein the omnidirectional camera images depicts a 360 degree view of an area. The rectification module 304 may access the data object and apply one or more linear rectification techniques to bring the image into a common image plane.

At operation 406, the point cloud module 306 generates a point cloud based on the rectified data object, wherein the point cloud comprises a set of data points in space that define properties of the external surfaces of objects in the space. For example, from a given perspective, a point of a point cloud may define a distance of a surface from the perspective.

At operation 408, the point cloud module 306 assigns the point cloud to a location based on at least the location data of the data object. For example, the point cloud module 306 may assign the point cloud to a geo-fence that encompasses a location. In some embodiments, assigning the point cloud to a location may include aligning the point cloud with a location based on landmarks within the location.

At operation 410, the image module 302 detects a client device 102 at a location. For example, the client device 102 may generate a request that includes location data that identifies the location, or may enter into a geo-fence that encompasses the location. In some embodiments, the client device 102 may generate image data that depicts one or more landmarks associated with the location, and the image module 302 may identify the location based on the image data from the client device 102.

At operation 412, responsive to the image module 302 detecting the client device 102 at the location, the point cloud module 306 loads the point cloud that corresponds with the location at the client device 102. Accordingly, AR content may be displayed at the client device 102 based on the point cloud.

FIG. 5 is a flowchart depicting a method 500 of generating a point cloud, according to certain example embodiments. Operations of the method 500 may be performed by the modules described above with respect to FIG. 3. As shown in FIG. 5, the method 500 includes one or more operations 502, and 504, that may be performed as a part (i.e., a subroutine) of operation 402 from the method 400.

At operation 502, the image module 302 accesses video data that comprises a set of video frames. For example, the video data may be generated by one or more client devices 102 and indexed at a memory location within a database 120 associated with the location.

At operation 504, the image module 302 exports a portion of the set of video frames, wherein each video frame among the portion of the set of video frames comprises image data, location data, and orientation data.

In some embodiments, the portion of the set of video frames may be exported based on properties of surface features of an area depicted by the video. For example, more complex surfaces may require a greater number of video frames to accurately depict the surfaces with a point cloud, while simple surfaces (i.e., few objects, and only a few surfaces) may require fewer video frames.

In some embodiments, the portion of the set of video frames may be exported based on a collection rate associated with the video data, wherein the collection rate may be defined as a speed of travel. For example, the faster a sensor-devices moves through an area, a larger number of video frames may need to be exported.

Accordingly, the method 500 may continue to operation 404 of the method 400, wherein the rectification module 304 performs linear rectification upon the set of video frames to generate the rectified data object.

FIG. 6 is a flowchart depicting a method 600 of loading a portion of a point cloud at a client device 102, according to certain example embodiments. Operations of the method 600 may be performed by the modules described above with respect to FIG. 3. As shown in FIG. 6, the method 600 includes one or more operations 602, 604, and 606, and may be performed as a part of operation 412 of the method 400.

At operation 602, the point cloud module 306 determines a contextual condition associated with the client device 102. The contextual condition may include a temporal condition (i.e., a time of day), a device attribute or property, as well as location data of the client device 102.

For example, in some embodiments, the contextual condition may include an indication of a device type of the client device 102, a network speed associated with the client device 102, as well as a memory capacity of the client device 102.

In some embodiments, the contextual condition may include a time of day associated with a request from the client device 102. For example, the time of day may be determined based on metadata associated with requests from the client device 102 or based on properties of images generated at the client device 102.

In some embodiments, the contextual condition may include a perspective, of point of view associated with the client device 102, wherein the point of view may provide an indication of landmarks which may be visible from the location of the client device 102.

At operation 604, the point cloud module 306 identifies a portion of the point cloud associated with the location based on the contextual condition of the client device 102. At operation 606, the portion of the point cloud is loaded at the client device 102.

Figure 7:
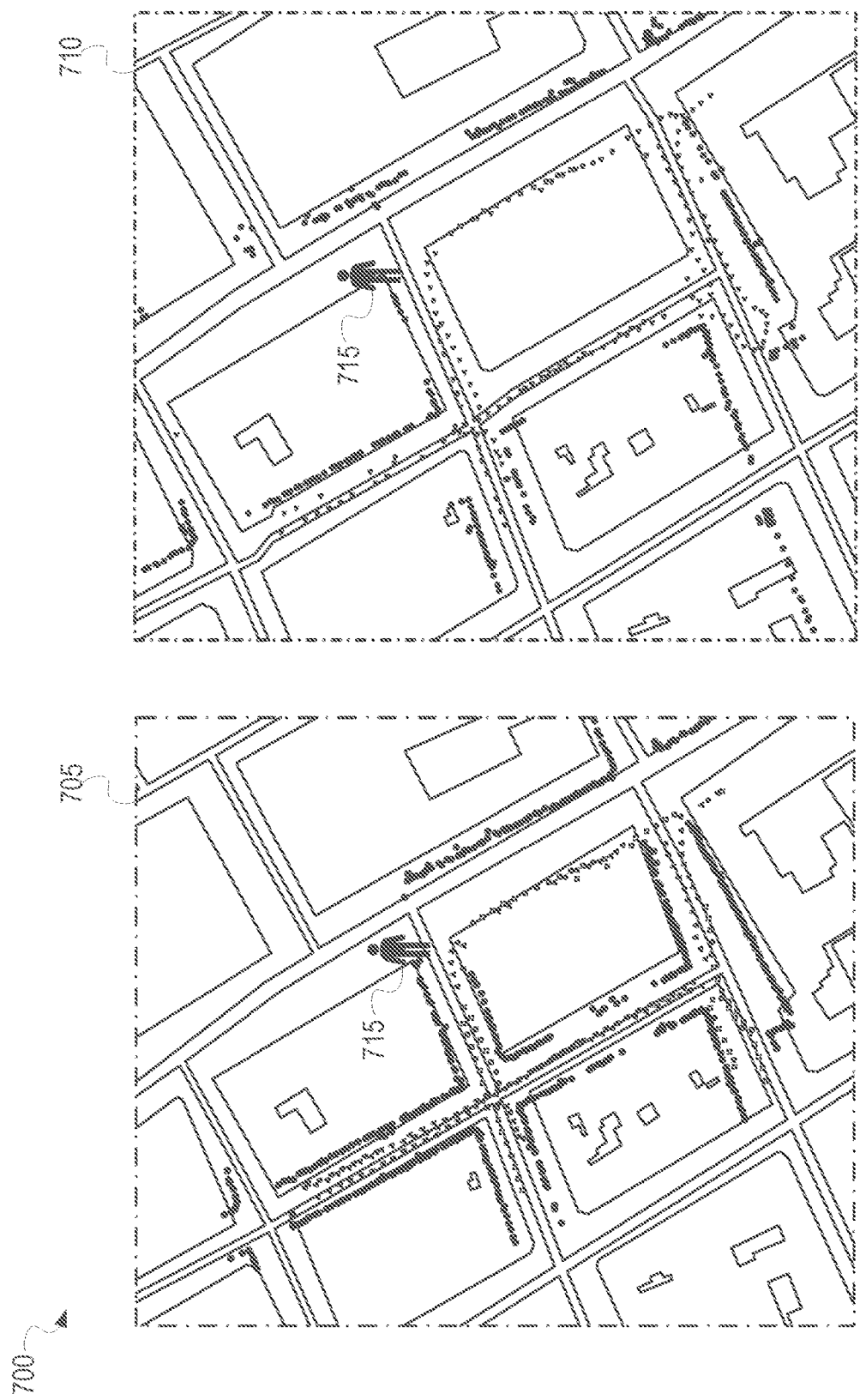
FIG. 7 is a diagram depicting a method of selecting a portion of a point cloud, according to certain example embodiments.

FIG. 7 is a diagram 700 depicting a method of selecting a portion of a point cloud, according to certain example embodiments. The diagram 700 includes depictions of a point cloud 705 and a point cloud 710, wherein the point clouds each represent surface features of the same geographic region.

As discussed in the method 600 depicted in FIG. 6, certain embodiments of the AR system 124 provides functionality to selectively filter portions of a point cloud to be loaded at a client device 102, based on a number of factors that may include contextual factors. Accordingly, point cloud 710 represents a selected portion of points from the point cloud 705.

In certain embodiments, the point cloud module 306 may select the portion of the point cloud 705 such that a distribution of points remains the same. For example, as seen in the diagram 700, a distribution of points of the point cloud 710 is roughly the same as the distribution of points seen in the point cloud 705.

In certain embodiments, the point cloud module 306 may select a portion of the point cloud 705 based on a position of a user 715. For example, the point cloud module 306 may access location data from a client device 102 of the user 715 and determine visible landmarks and surfaces from the location of the user 715. A portion of the point cloud 705 may be selected based on what landmarks are visible.

In certain embodiments, the point cloud module 306 may select a portion of the point cloud 705 based on context factors associated with the user 715 (i.e., location, time, etc.), and attributes of each point of the point cloud 705. For example, a point may have attributes that indicate a time of day in which they were collected. Accordingly, responsive to determining a current time associated with the user 715, the point cloud module 715 may select all points from the point cloud 705 which represent surface features of an area at the same time. As an illustrative example, the point cloud module 306 may generate the point cloud 705 based on data objects that include image data, wherein the image data represents an object or location at a specific time or time of day (i.e., night, day). Accordingly, each point of the point cloud 705 may comprise attributes that indicate a time of day in which the point was collected.

In some embodiments, the point cloud module 306 may generate the point cloud 710 by starting with an "empty" point cloud, and then adding one point from the point cloud 705 at a time until a target point cloud property has been reached. For example, the property may include a ratio of visible points to all points from a given perspective of a client device 102. In some embodiments, the property may include a size of the point cloud, in terms of bytes.

Software Architecture

Figure 8:
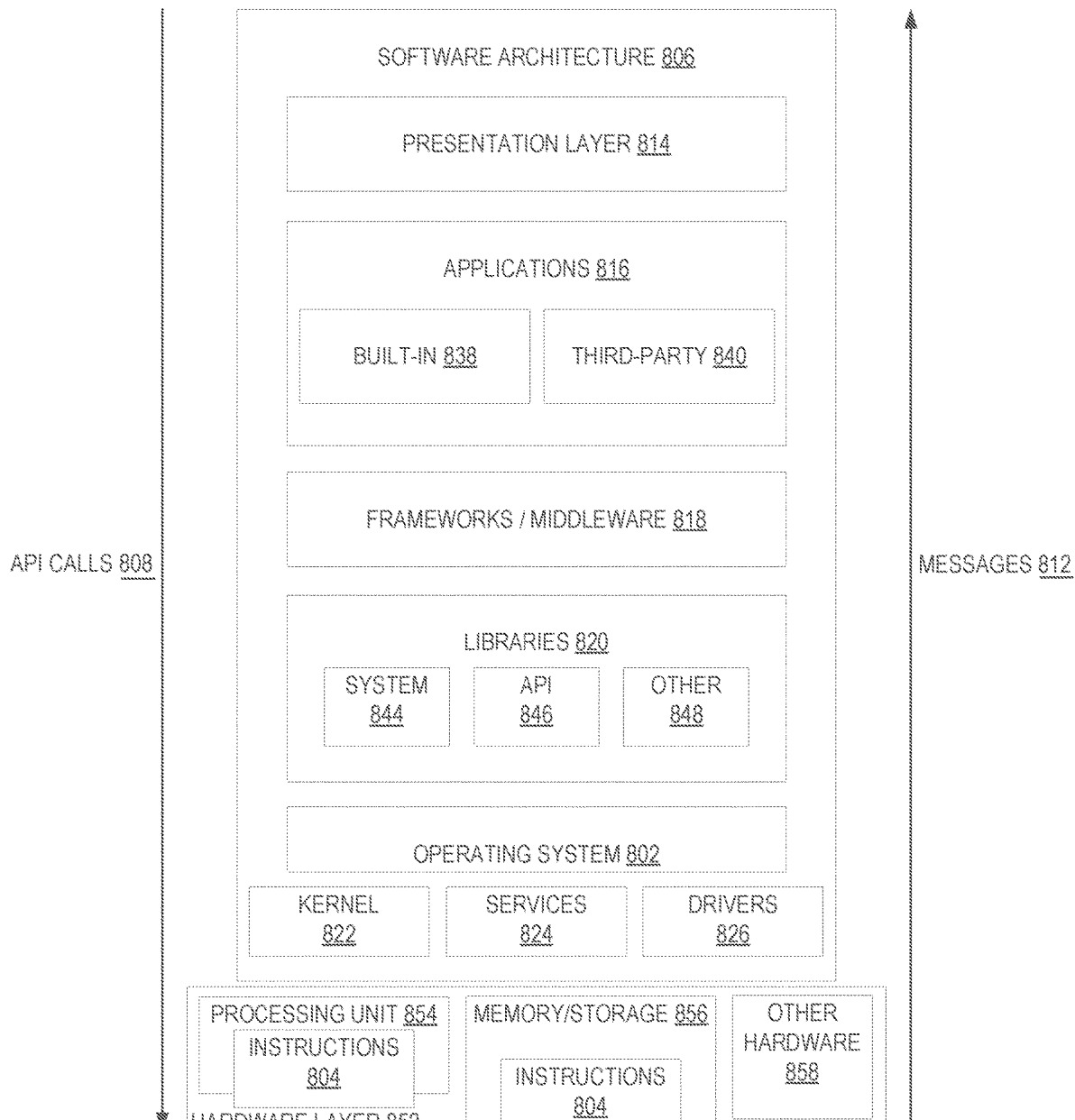
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 906 may execute on hardware such as machine 900 of FIG. 9 that includes, among other things, processors 904, memory 914, and I/O components 918. A representative hardware layer 852 is illustrated and can represent, for example, the machine 800 of FIG. 8. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
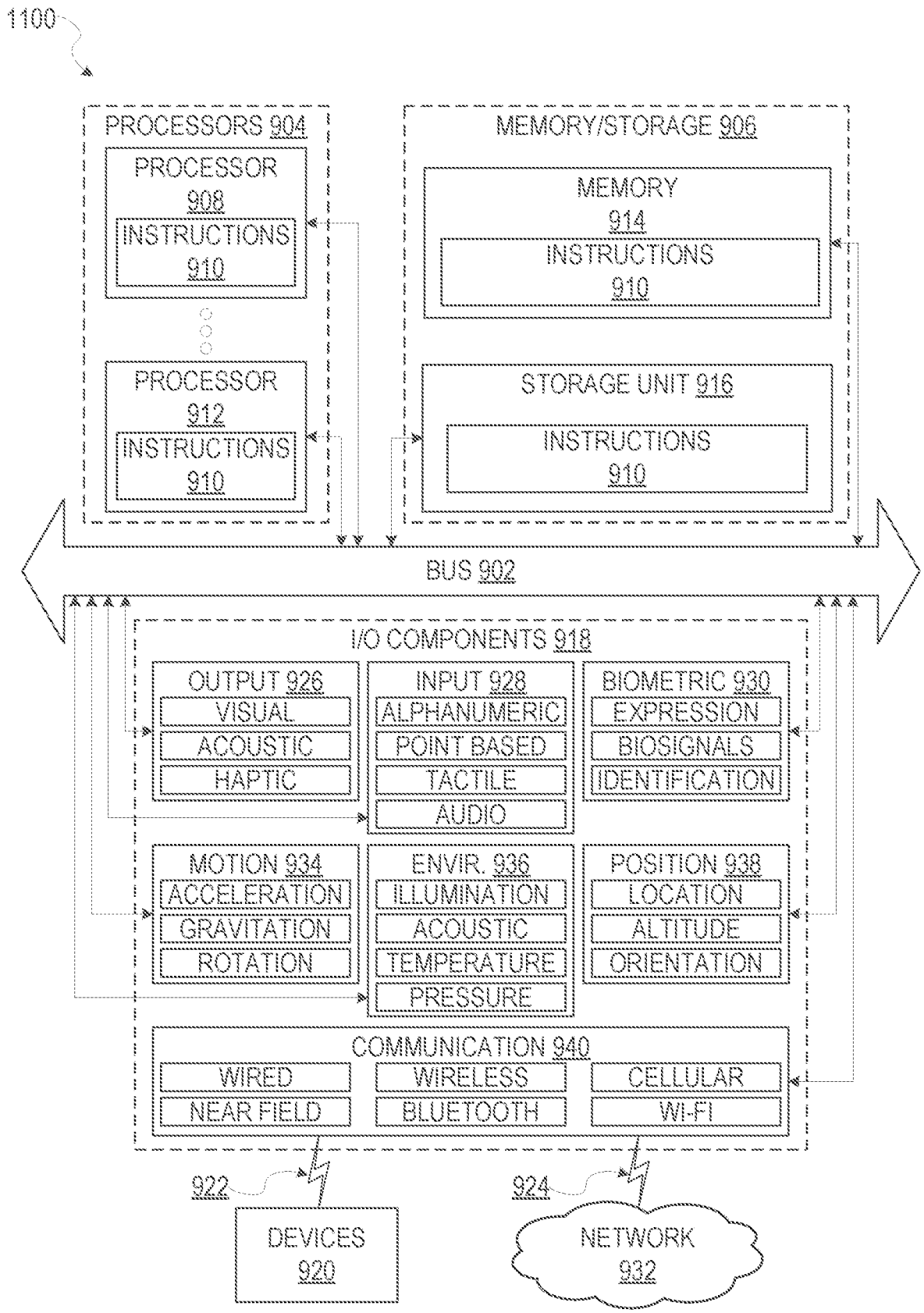
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLS™)" in this context refers to a recurrent neural network (RNN) architecture that remembers values over arbitrary intervals. Stored values are not modified as learning proceeds. RNNs allow forward and backward connections between neurons. BLS™ are well-suited for the classification, processing, and prediction of time series, given time lags of unknown size and duration between events.

What is claimed is:

1. A method comprising:
receiving, from a client device, a request that identifies a location;
accessing a point cloud associated with the location within a database responsive to the request;
determining a perspective of the client device;
identifying a portion of the point cloud based on the perspective of the client device; and
loading the portion of the point cloud at a client device.

2. The method of claim 1, wherein the request comprises an image that comprises a set of image features, and the method further comprises:
identifying the location based on the set of image features of the image.

3. The method of claim 2, wherein the identifying the portion of the point cloud is based on the perspective of the client device and the set of image features of the image.

4. The method of claim 1, wherein the identifying the portion of the point cloud based on the perspective of the client device further comprises:
determining a connectivity speed of a network associated with the client device; and
identifying the portion of the point cloud based on the perspective of the client device and the connectivity speed of the network.

5. The method of claim 1, further comprising:
causing display of media content at the client device based on the portion of the point cloud.

6. The method of claim 5, wherein the media content comprises Augmented-Reality (AR) content.

7. The method of claim 1, wherein the point cloud comprises a plurality of data points that represent a plurality of features of a surface associated with the location, and wherein at least a feature from among the plurality of features of the surface of the location is represented by a first data point associated with a first contextual condition and a second data point associated with a second contextual condition, and wherein the identifying the portion of the point cloud further comprises:
detecting a contextual condition associated with the client device, the contextual condition including the first contextual condition; and
identifying the portion of the point cloud based on the perspective of the client device and the first contextual condition, the portion of the point cloud including at least the first data point.

8. A system comprising:
a memory; and
at least one hardware processor coupled to the memory and comprising instructions that causes the system to perform operations comprising:
receiving, from a client device, a request that identifies a location;
accessing a point cloud associated with the location within a database responsive to the request;
determining a perspective of the client device;
identifying a portion of the point cloud based on the perspective of the client device; and
loading the portion of the point cloud at a client device.

9. The system of claim 8, wherein the request comprises an image that comprises a set of image features, and the method further comprises:
identifying the location based on the set of image features of the image.

10. The system of claim 9, wherein the identifying the portion of the point cloud is based on the perspective of the client device and the set of image features of the image.

11. The system of claim 8, wherein the identifying the portion of the point cloud based on the perspective of the client device further comprises:
determining a connectivity speed of a network associated with the client device; and
identifying the portion of the point cloud based on the perspective of the client device and the connectivity speed of the network.

12. The system of claim 8, further comprising:
causing display of media content at the client device based on the portion of the point cloud.

13. The system of claim 12, wherein the media content comprises Augmented-Reality (AR) content.

14. The system of claim 8, wherein the point cloud comprises a plurality of data points that represent a plurality of features of a surface associated with the location, and wherein at least a feature from among the plurality of features of the surface of the location is represented by a first data point associated with a first contextual condition and a second data point associated with a second contextual condition, and wherein the identifying the portion of the point cloud further comprises:

detecting a contextual condition associated with the client device, the contextual condition including the first contextual condition; and identifying the portion of the point cloud based on the perspective of the client device and the first contextual condition, the portion of the point cloud including at least the first data point.

15. A non-transitory machine-readable storage medium comprising instructions that, when executed by one or more processors of a machine, cause the machine to perform operations comprising:

receiving, from a client device, a request that identifies a location;

accessing a point cloud associated with the location within a database responsive to the request;

determining a perspective of the client device;

identifying a portion of the point cloud based on the perspective of the client device; and loading the portion of the point cloud at a client device.

16. The non-transitory machine-readable storage medium of claim 15, wherein the request comprises an image that comprises a set of image features, and the method further comprises:

identifying the location based on the set of image features of the image.

17. The non-transitory machine-readable storage medium of claim 16, wherein the identifying the portion of the point cloud is based on the perspective of the client device and the set of image features of the image.

18. The non-transitory machine-readable storage medium of claim 15, wherein the identifying the portion of the point cloud based on the perspective of the client device further comprises:

determining a connectivity speed of a network associated with the client device; and identifying the portion of the point cloud based on the perspective of the client device and the connectivity speed of the network.

19. The non-transitory machine-readable storage medium of claim 15, further comprising:

causing display of media content at the client device based on the portion of the point cloud.

20. The non-transitory machine-readable storage medium of claim 19, wherein the media content comprises Augmented-Reality (AR) content.

* * * * *